United States Patent [19]

Muir

[11] Patent Number: 5,202,772
[45] Date of Patent: Apr. 13, 1993

[54] COLOR HALFTONE SCREEN UTILIZING PRESELECTED HALFTONE DOTS PLACED AT PRESELECTED DISTANCE AND SCREEN ANGLES FROM CENTER HALFTONE DOTS

[75] Inventor: Max K. Muir, Calabasas, Calif.

[73] Assignee: Volt Information Sciences, Inc., New York, N.Y.

[21] Appl. No.: 663,726

[22] Filed: Feb. 28, 1991

[51] Int. Cl.$^5$ .................................. H04N 1/46
[52] U.S. Cl. ..................... 358/459; 358/456; 358/458; 358/75; 358/80; 358/78
[58] Field of Search ............ 358/456, 458, 459, 75, 358/78, 80

Primary Examiner—Edward L. Coles, Sr.
Assistant Examiner—C. Lam
Attorney, Agent, or Firm—Kenyon & Kenyon

[57] ABSTRACT

A plurality of halftone screen density data structures utilizing halftone dot patterns which arrays the halftone dots at preselected screen angles and at a preselected distance to create a screened halftone separation. By arraying the halftone dots at preselected screen angles, the human eye is confused into perceiving continuous patterns and is less likely to perceive any Moiré pattern than when using conventional methods. The data structures are created by arranging for every halftone dot in at least one halftone dot pattern of the data structures to be surrounded by a plurality of dots having their dot centers at preselected screen angles and at a preselected distance from the dot center of the center halftone dot. The halftone dots are superimposed over a plurality of bits arranged as a bit map which is representative of a pixel format utilized to produce screens wherein each bit in the bit map is assigned a value in a predetermined fashion. The values are utilized when binary representations of the density of an image for a sampled area are transformed to pixel format. Through this process, the halftone screen density data structures are utilized to transform binary representations of images to a pixel format which is utilized to reproduce a desired artwork.

34 Claims, 10 Drawing Sheets

Microfiche Appendix Included
(29 Microfiche, 1 Page)

COLOR HALFTONE SCREEN UTILIZING PRESELECTED HALFTONE DOTS PLACED AT PRESELECTED DISTANCE AND SCREEN ANGLES FROM CENTER HALFTONE DOTS

FIELD OF THE INVENTION

The present invention relates to the electronic creation and reproduction of halftone images for use in graphic arts applications, and, more particularly, to halftone screen density data structures and the utilization of halftone screen density data structures to reproduce halftone images.

APPENDIX

A Appendix is attached hereto and is part of the disclosure hereof. The Appendix of this patent document contains material which is subject to copyright. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Graphic arts applications frequently require the accurate reproduction of a high resolution image, i.e., artwork, such as a black and white or a color photograph. A typical application might involve printing a high resolution color image on a page of a periodical such as a magazine or on a postcard.

Color images can be generated either photographically, i.e., on film, or electronically, i.e., on some electronic media. When generated, these images are recorded on a continuous tone ("contone") basis. A continuous tone is defined as the variation in the ability of a material to absorb light within a photographic or printed image which corresponds to the graduated range of lightness or darkness in the original copy or scene. To represent a continuous tone, the color existing at any point in the image is recorded by an amplitude value, either exposure in the case of film or a voltage level in the case of electronic media.

Color reproduction equipment takes advantage of the principle that any color can be separated into a specific linear combination of primary subtractive colors (yellow, magenta, cyan and black, hereinafter referred to collectively as "the primary colors") in which the amount of each primary color is set to a predetermined amount. In the case of printed reproductions of an image, the use of primary color printing obviates the need to use differently colored ink for each different color in the image. However, in some cases specialty inks are used. As such, each image is converted into a succession of color separations wherein each separation is either a negative or positive transparency with an altered tone reproducing characteristic that carries the color information for one of the primary colors and also any other color that is required to reproduce an image. The term "printing color" will be used to refer to the primary colors and any other colors that may be utilized to reproduce an image.

A separation is frequently made by photographing or electronically scanning an artwork through an appropriately colored filter. If a digital scanner is used, then each resulting continuous tone value is represented by a value, e.g., binary number, within a range of values that represents the relative intensity of a corresponding printing color. This relative intensity is commonly referred to as the "density" of the printing color. The density is actually a measurement of the light stopping ability of a tone area—less light will be stopped by a brighter tone whereas more light will be stopped by a darker tone. A separate set or file of corresponding continuous tone values are created for each separation for each of the printing colors.

Since printing presses are only capable of either applying or not applying a single amount of ink for a given location and cannot apply differential amounts of ink at a given location, the full range of continuous tone gradations are achieved by utilizing halftone dots. A halftone image is essentially a pulse width modulation representation of the amplitude modulation form of the continuous tone which is converted by the human eye into a desired color. The size of the dots which comprise the halftone image are varied to yield variations in the printing color densities. Thus, smooth tonal variations are generated in a reproduced image by smoothly changing dot sizes. A full color image is formed by overlaying single halftone reproductions, i.e., layers, for all of the printing colors where each layer is formed from a halftone dot separation that contains dots of appropriate sizes and in one of the printing colors. In the case where specialty inks are used to reproduce colors in addition to the primary colors, additional layers are formed for each additional color.

An image created using halftones is created where the range of tones consists of dots of varying area but of uniform density. Thus, with halftone techniques, it is possible to break the continuous tone into tiny dots of different sizes to create the illusion of continuous tone when seen at a distance. This illusion is achieved by confusing the human eye to perceive a continuous pattern. The human eye is receptive to light radiation throughout what has become known as the visible spectrum. Receptors within the human eye allow the brain to differentiate between wavelengths of radiated light to produce the sensation of color. The graphics arts industry has used this basic color theory in the development of color printing. Color is divided into three basic additive colors—red, green and blue—and the subtractive primary colors—yellow, magenta, cyan and black. Subtractive colors are those frequencies reflected from a surface or object.

The process of digitally transforming continuous tone values into halftone dots is called "screening". This process creates a pattern which confuses the human eye so that patterns of a reproduced image appear continuous when in reality they comprise small, varying sized dots.

As the size of the dots decrease, an increasing amount of detail can be encoded in a dot pattern which, in turn, increases the detail in the reproduced image. The higher the number of dots utilized for a reproduction, however, the more sensitive the image quality of the reproduction is to printing press variations. For these reasons, in graphics arts applications, resolutions ranging from 65 to 200 dots per inch are considered suitable to balance these conflicting image requirements. The number of halftone dots per inch in a halftone screen is referred to as the "screen ruling".

To generate a color halftone image, separate runs of yellow, magenta, cyan and black are performed on a printing press. When each color separation is screened, an undesirable low frequency beat pattern may appear as a repeating pattern called a Moiré pattern when the layers are superimposed on a printed sheet. This pattern is discernable by the human eye because the human eye is capable of perceiving images quickly in the horizontal and the vertical direction, but has more difficulty with images that are angular. Thus, to minimize the effect of Moiré patterns, each color separation for each printing color is screened using a halftone dot pattern which is physically oriented along a different "screen angle" on the printed sheet. The "screen angle" is an angle measured from a line vertical to the base of the screen to a line formed through the diagonally opposite corners of the dot pattern. The orientation of the halftone dot pattern at preselected screen angles shifts the low frequency beat patterns to a higher frequency which is more difficult for the human eye to detect thereby improving the image quality. Commonly used screen angles in graphic arts applications are 45 degrees for black, 75 degrees for magenta, 90 degrees for yellow and 105 degrees for cyan.

The angular displacement of screens to overcome the effects of Moiré patterns finds its origins in the pre-electronics days. Screens made of glass were used to create the halftone dots that create halftone screens. The glass was ruled, i.e., straight lines were drawn, in the vertical direction on the glass sheet. An identical set of lines were then superimposed upon the glass sheet perpendicular to the vertical lines thereby creating what has become known as a "cross-lined screen". The halftones were created by laying the screen over an image and vignetting light through the screen thereby creating dots. Thus, the angular displacement of screens was developed because the concept of the cross-lined screen was carried over as the electronics were adapted to create halftone images.

The screening of halftone dot patterns for each of the primary colors is done at the foregoing screen angles. The color separations created through this screening process are then superimposed one upon the other to create a pattern for a color image. The screening of the halftone dot patterns for each one of the primary colors at the specified angles requires the dot patterns to be arranged with reference to a specific point to avoid Moiré patterns. Therefore, the physical placement, i.e., registration, of the dot patterns is critical. If the screen angles are not accurate, Moiré patterns will develop. Thus, angular registration must be precise.

Furthermore, high resolution screening, i.e., 133 or 150 dots/inch, is generally used for high image quality reproductions in graphic arts applications. The cost of a device which prints the actual reproduced image increases as the desired resolution increases. Moreover, the storage requirements placed upon an imaging system that produces high resolution images is greater than one that produces lower resolution images. This is because more samples of the image to be reproduced are required which, in turn, requires the use of a greater number of smaller halftone dots to increase the amount of detail that is encoded in a halftone dot pattern. The greater the number of dots utilized for a reproduction, however, the more storage space that is required to store the data utilized to create the halftone dots.

It is apparent from the foregoing that there are problems in the prior art in accurately reproducing high quality halftone color images. In particular, the sensitivity of the angular registration of the halftone dot patterns renders the associated electronics and mechanical features highly complex. In addition, more expensive, higher quality typesetters or printers capable of producing high resolution images are required when high quality halftone color images are desired.

SUMMARY OF THE INVENTION

The present invention reduces the sensitivity of the angular registration of halftone dot patterns for each printing color, simplifies the electronic creation of halftone dots and reduces the susceptibility to Moiré patterns by utilizing halftone screen density data structures which comprise at least one halftone dot pattern corresponding to a printing color. The halftone dot pattern includes a plurality of bits arranged as a bit map, each one of the plurality of bits in the bit map having a value assigned to it in a predetermined fashion. A plurality of halftone dots are superimposed over the bit map, each one of the plurality of halftone dots having a dot center. The plurality of halftone dots are arranged so that each one of the plurality of halftone dots is a center halftone dot surrounded by a preselected number of the plurality of halftone dots. The dot centers of the preselected number of the plurality of halftone dots are placed at a preselected distance and at preselected screen angles from the dot center of the center halftone dot.

By arraying the halftone dots at the preselected screen angles and positioning the dot centers of the preselected number of 15 the plurality of halftone dots at a preselected distance from the dot center of the center halftone dot within each one of the halftone dot patterns, the human eye is further confused into perceiving continuous patterns and is less likely to perceive any Moiré pattern than when using conventional methods. Thus, the quality of reproduced images is improved so that lower resolution typesetters or printing presses can be employed for those graphic arts applications where high resolution quality is desired. This, in turn, reduces the amount of storage required to store the data utilized to create the halftone dots.

To accomplish the arraying of halftone dots at the preselected angles, the present invention utilizes a plurality of halftone screen density data structures, to produce an image from scanned data. Each halftone screen density data structure may comprise one or more halftone dot patterns. In the case of color artwork, a halftone screen density data structure comprises one halftone dot pattern for each printing color. The halftone screen density data structures are maintained as data or digital images in a storage device. The data structures are created by arranging for every halftone dot to be surrounded by a plurality of halftone dots having their dot centers at a preselected distance and at preselected angles from the halftone dot in the center.

The positioning of the dots centers in a halftone dot pattern of a halftone screen density data structure is a function of the screen ruling selected to create a halftone image. For example, a first one of a plurality dots is chosen and its dot center is positioned. A dot center for a second one of the plurality of dots is placed at a distance chosen to be the inverse of a desired screen ruling, i.e., the number of lines of halftone dots per inch in each direction on a halftone screen, from the dot center of the center dot. The dot center of the second one of the plurality of dots is placed at a first preselected screen angle, e.g., 45 degrees. The screen angle is measured from a line vertical to the base of the screen to a line formed through the diagonally opposite corners of the dot pattern. A reference circle is then placed utilizing the distance from the dot center of the center dot to the dot center of the second one of the plurality of dots as the radius. A dot center for a third one of the plurality of dots is then placed along the circumference of the reference circle at a second preselected screen angle, e.g., 105 degrees. A dot center for a fourth one of the plurality of dots is placed along the circumference of the reference circle at a screen angle, e.g., 165 degrees. Dot centers for fifth, sixth and seventh ones of the plurality of dots are placed by extending lines from the dot centers of the second, third and fourth ones of the plurality of dots through the dot center of the center dot. Thus, the dots centers of the fifth, sixth and seventh ones of the plurality of dots are placed at screen angles so that they are mirror images of the second, third and fourth dots.

The foregoing process of creating halftone dots is repeated to generate a plurality of halftone dots, each one being a center dot and each one having a preselected number of a plurality of halftone dots surrounding it at the foregoing screen angles.

The halftone dots created for a halftone dot pattern are superimposed over a plurality of bits arranged as a bit map which is representative of the format utilized to produce screens. Each one of the plurality of bits in the bit map is assigned a value in a predetermined fashion. The values are utilized when binary representations of the density of an image for a sampled area are transformed to bit format. Specifically, when reproducing an image, a bit or bits in a predetermined range within a halftone dot pattern of a preselected halftone screen density data structure are set if they correspond, e.g., are less than or equal to, a given density value. Through this process, the halftone screen density data structures of the present invention are utilized to transform binary representations of images to create a halftone dot structure representative of the density level of a scanned image which is utilized to create a halftoned image of the desired artwork.

Instead of creating a plurality of distinct halftone dot patterns for halftone screen density data structures for each of the printing colors wherein the dot patterns are arranged at different preselected angles, the halftone screen density data structures of the present invention include one halftone dot pattern having same basic halftone dot pattern created for a particular halftone screen density data structure for each one of the printing colors. The halftone dot patterns are utilized to create digital separations for each one of the printing colors. The difference being in the values assigned to the plurality of bits in the bit map. Essentially, different values are assigned to each bit in the bit map for each halftone dot pattern for each printing color so that the same value is not assigned to the same bit for any of the halftone dot patterns of the same halftone screen density data structures.

An exemplary system for implementing the present invention comprises a storage device to store scanned data and a plurality of halftone screen density data structures and a raster image processor. The raster image processor creates digital separations for each printing color utilizing a digital image and the halftone screen density data structures stored in the storage device. The system may also include an electronic scanner to convert artwork from continuous tones to a digital image for each printing color. The digital images are stored in the storage device.

To reproduce an artwork using the present invention, the artwork is scanned to create a digital image of the artwork by sampling preselected areas of the artwork to ascertain a density value for the sampled area. The sampling is performed at a predetermined rate which is selected to be greater than the highest screen ruling at which the system is capable of reproducing an image. If the artwork scanned is a color artwork, the artwork is filtered into its individual printing color components before ascertaining density values for each printing color. The density for each printing color is based upon the amount of light reflected from or passed through the area of the artwork being scanned. The density values depend upon the number of bits that are used to represent the range of densities of the printing colors, e.g., yellow, magenta, cyan and black, etc., in the artwork from total white to total yellow, total white to total magenta, total white to total cyan or total white to total black, etc. The density values of the artwork for each printing color ascertained are stored in a data base maintained in the storage device. This information is maintained in an array pattern as an entity so that it can be easily retrieved and reproduced.

The density data is then retrieved from the data base for one printing color at a time. Also, a preselected halftone screen density data structure is retrieved from the storage device and maintained in a memory associated with the raster image processor. The preselected halftone screen density data structure utilized is dictated by the resolution of the device which will actually produce the artwork as a halftoned image. The raster image processor retrieves density data for one of the printing colors from the data base and compares the data, one sample at a time, to values assigned to a portion of the plurality of bits in the halftone dot pattern, for the printing color being processed, of the preselected halftone screen density data structure retrieved. The raster image processor performs this comparison for each density data entry in the printing colors data base, each time comparing the entry to a next portion of the plurality of bits in the halftone dot pattern, for the printing color being processed, of the preselected halftone screen density data structure. As a result of this process, bits having values assigned to them that are within the density range of the density data sample are set which will cause selected pixels, i.e., the smallest tonal element in a digital imaging system, to be turned on to represent the desired density for the area represented by the sample.

The foregoing process is repeated until each entry in each printing color data base has been processed and the appropriate bits in the appropriate halftone dot pattern of the preselected halftone screen density data structure have been set to reflect the density pattern for each printing color across the reproduced halftone image. The end result of this processing is that a halftone screened separation for each printing color is created in the memory associated with the raster image processor which reflects the density pattern across the scanned artwork. The separations can then be output to the imager where they can be reproduced onto photographic media to complete the reproduction process and produce a halftone image of the scanned artwork.

DETAILED DESCRIPTION

Figure 1:
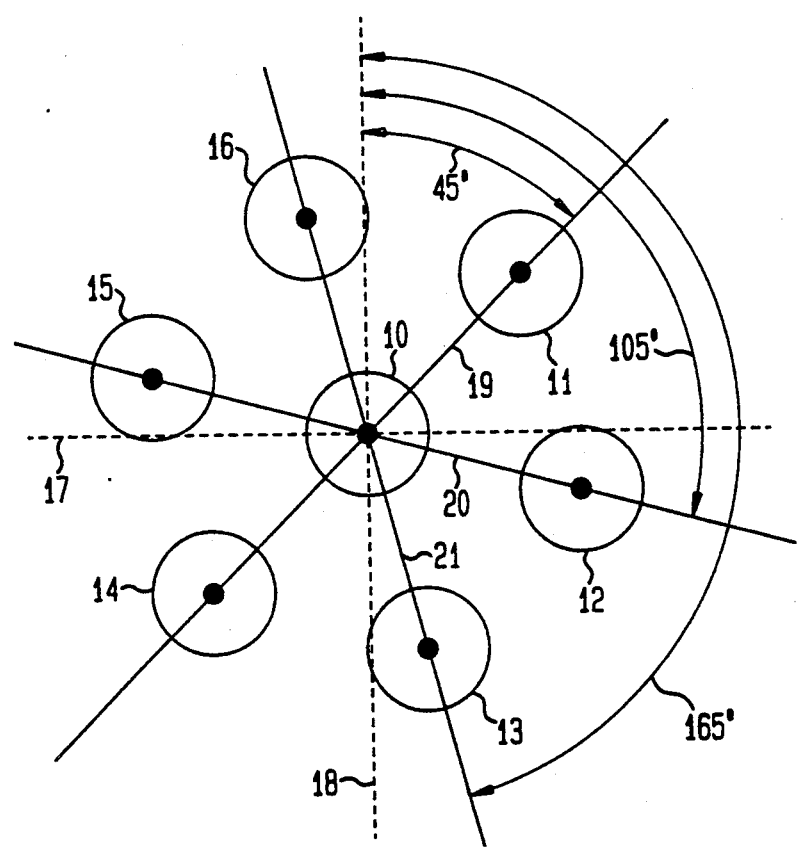
FIG. 1 is an illustration of the positioning of halftone dots for a halftone dot pattern of a halftone screen density data structure of the present invention.

The halftone screen density data structures of the present invention are created by first creating a computer file for each desired halftone screen density data structure. Different halftone screen density data structures are created for different imager resolutions, different halftone dot shapes and different screen rulings. As is known in the art, halftone dots can be shaped in a variety of manners. The most popular shapes being circular, elliptical and square. The halftone screen density data structures of the present invention reduces the need for square shaped halftone dots in most applications. Thus, while the halftone screen density data structures of the present invention could be created for a variety of shapes, only circular halftone dots are discussed and illustrated for simplicity of description.

The halftone screen density data structure files of the present invention are created on a computer, for example, a VAX 11/780 computer manufactured by Digital Equipment Corporation, using known spreadsheet software techniques, for example, DECALC (a spreadsheet program developed by Digital Equipment Corporation), to lay out the halftone screen density data structures dot centers for a desired imager resolution. The layout of the spreadsheet on a video display terminal appears as a plurality of cells which are utilized to represent a simulated plurality of bits arranged as a bit map.

The data structures comprise at least one halftone dot pattern. Typically there are more than one halftone dot pattern for each halftone screen density data structure, one for each printing color. The data structures are created one halftone dot pattern at a time.

To create a halftone dot pattern of a halftone screen density data structure of the present invention, a location for a dot center for a center dot is chosen. A second dot center is laid out by first calculating the required distance between dot centers. The distance between the dot centers for a given halftone screen density data structure is determined by the desired screen ruling, i.e., the number of lines of halftone dots per inch in each direction on a halftone screen. The distance between dot centers is the inverse of the screen ruling. For example, for a given screen ruling of 100 lines per inch, the distance between dot centers for this screen ruling is 1/100th of an inch. The second dot center is placed at a distance from the dot center of the center dot equal to the inverse of the screen ruling, at a first preselected screen angle, e.g., 45 degrees. As defined above, a screen angle is measured from a line vertical to the base of the screen to a line formed through the diagonally opposite corners of the dot pattern.

After the dot centers of the center and second dots are placed, a reference circle is placed utilizing the distance from the dot center of the center dot to the dot center of the second dot as the radius. A third dot center is then placed along the circumference of the reference circle at a second preselected screen angle of 105 degrees, 60 degrees from the dot center of the second dot. A fourth dot center is placed along the circumference of the reference circle at a third preselected screen angle of 165 degrees. Fifth, sixth and seventh dot centers are placed by extending lines from the dot centers of the second, third and fourth dots through the dot center of the center dot. Thus, the dots centers of the fifth, sixth and seventh ones of the plurality of dots are placed at screen angles so that they are mirror images of the second, third and fourth dots. The foregoing screen angles are further illustrated and discussed below.

The process of creating halftone dots is repeated by duplicating the dots centers created to thereby create a complete halftone dot pattern of a halftone screen density data structure. The completed halftone dot pattern has a plurality of halftone dots, each one of the plurality of halftone dots is arranged to be a center dot, having dots surrounding it at the foregoing preselected screen angles described above. This process is repeated if the halftone screen density data structure will be used for creating images having more than one printing color to create a plurality of halftone dot patterns, one for each printing color.

Once the halftone dot centers are defined, values, e.g., numbers, are assigned to each cell in the spreadsheet which is representative of each bit in the bit map in a predetermined fashion which is discussed below. The values assigned to each bit, i.e., cell, in the bit map represent the range of density values of the printing colors that a system utilizing the present invention is capable of reproducing. Only a portion of the bits are assigned a value. Using the capabilities of the spreadsheet program for duplicating cells, the remaining bits in the bit map are assigned values automatically as the values begin to repeat themselves.

A specific exemplary implementation of a computer file of a halftone screen density data structure of the present invention generated using the above-described technique is set forth in the Microfiche Appendix attached hereto. The file illustrated therein is divided into four sections, one for each of the primary colors. The purpose of the four sections is to arrange the assigning of values to the bits in the bit map to achieve a shift in the halftone dot pattern. This, in turn, accomplishes a shift of the individual patterns for each of the primary colors when they are overlaid one on top of the other. This is illustrated in FIGS. 3A-3D and 4A-4C. The exemplary implementation was developed for a 180 line screen set for an imager having a resolution of 1016 dots per inch.

The halftone screen density data structure files created are then processed by a computer to convert the files to a format, e.g., binary, that can be utilized by an electronic image processing system. Once the conversion is complete, the binary version of the halftone screen density data structures are loaded onto a storage medium such as a diskette. The data structures are now in condition to be utilized by an electronic image processing system to reproduce high quality halftoned images.

Referring now to the drawings, and initially to FIG. 1, there is illustrated an exemplary composition of a halftone dot pattern of a halftone screen density data structure of the present invention. The halftone dot pattern of the data structure is created by arranging for every halftone dot to be surrounded by a plurality of dots having their dot centers at preselected screen angles. As illustrated, the dots are arranged so that one dot, e.g., 10, is surrounded by a preselected number of a plurality of dots, e.g., six, 11, 12, 13, 14, 15 and 16, which have their respective dots centers at preselected screen angles.

As shown, the halftone dots 11-16 have their respective dots centers at preselected screen angles. The preselected screen angle arrangement is illustrated through the use of an orthogonal set of axes 17 and 18 and by lines 19-21 drawn from the origin of the axes 17 and 18, which is the dot center of halftone dot 10, to the dot centers of surrounding halftone dots 11-16. As illustrated, the dot center of the halftone dot 11 is arranged at a 45 degree screen angle measured from the vertical axis 18 to the line 19. The dot center of the halftone dot 12 is arranged at a 105 degree screen angle measured from the vertical axis 18 to the line 20. The dot center of the halftone dot 13 is arranged at a 165 degree screen angle measured from the vertical axis 18 to the line 21.

The dot centers of the remaining halftone dots 14, 15 and 16 illustrated in FIG. 1 are placed by first extending lines 19-21 from the dot centers of the halftone dots 11, 12 and 13 through the dot center of the center halftone dot 10. The dot centers are then located at the points where the extended lines 19-21 intersect with the circumference of the reference circle that was drawn using the distance from the dot center of the center halftone dot 10 to the dot center of the halftone dot 11 as the radius. Thus, the dot centers of the halftone dots 14, 15 and 16 are placed at screen angles so that they are mirror images of the second, third and fourth dots.

Figure 2:
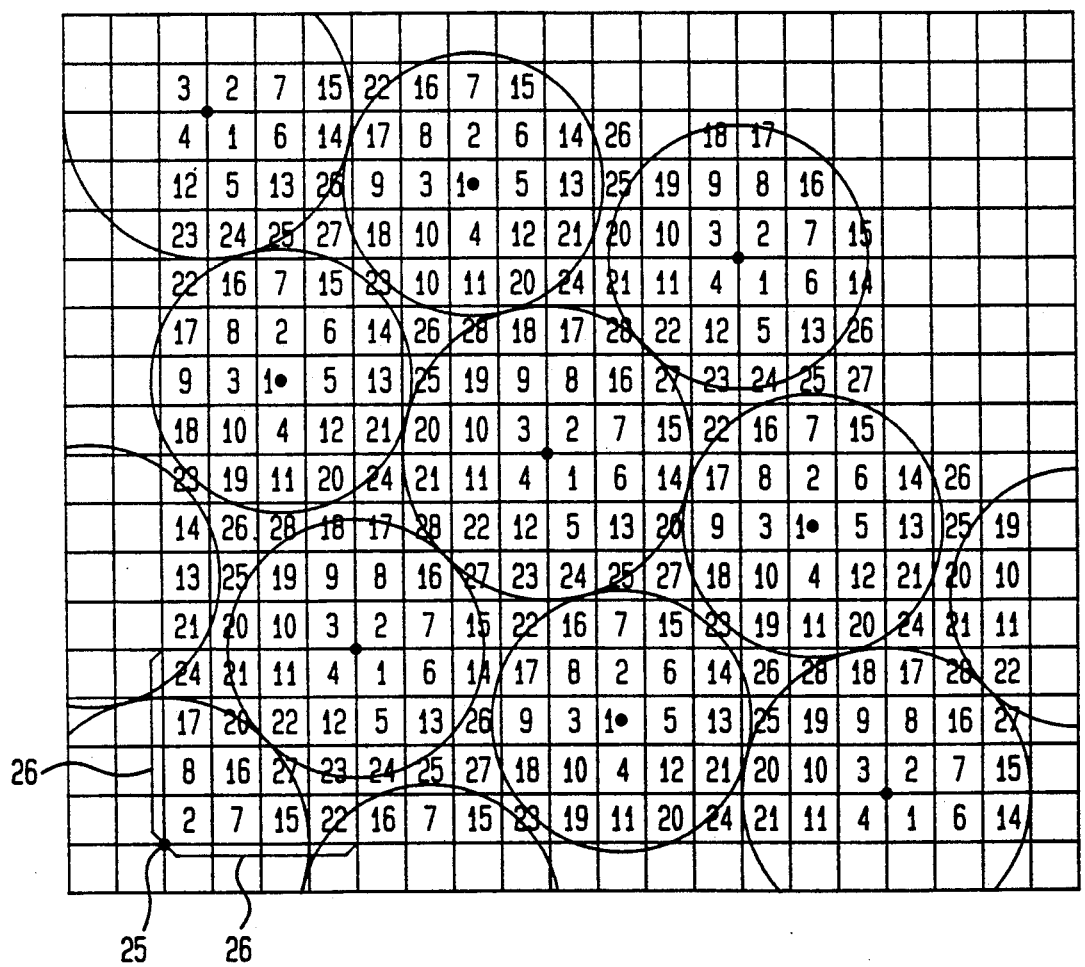
FIG. 2 is an illustration of an exemplary composition of a halftone dot pattern of a halftone screen density data structure of the present invention.

Referring now to FIG. 2, there is illustrated the halftone dot pattern of a halftone screen density data structure illustrated in FIG. 1, superimposed over a plurality of bits arranged as a bit map which is representative of a pixel format that is utilized to produce a screened halftone separation for each of the printing colors. Each bit in the bit map is assigned a value, e.g., a number, in a predetermined fashion. Each square box in FIG. 2 is representative of one bit of data which represents one pixel. The assigning of values to the pixels starts at the center of the dot and continues in a symmetrical fashion to approximate a circle around the dot center for the preselected number of pixels. The preselected number of pixels is equal to the range of density values that the halftone screen density data structure is capable of reproducing. As shown, each dot is assigned a value in an identical fashion. The importance of the values assigned to pixel locations will become apparent when the transformation of scanned data to rasterized data is discussed in detail below.

The foregoing halftone dot pattern illustrated in FIGS. 1 and 2 are replicated for the maximum number of pixels that may be required in the reproduction of artwork for a given screen ruling so that every halftone dot will have the preselected number of the plurality of halftone dots, e.g., six, surrounding it in the exemplary embodiment. Note that the number of halftone dots surrounding the center dot may be greater than six to further enhance the color quality of a halftone image. For example, 12 dots could be used and placed such that three dots are located in each quadrant of the x-y coordinate system illustrated in FIG. 1 at one-half of the screen angles utilized in the exemplary embodiment, i.e., 22.5 degrees, 45 degrees, 50.25 degrees, 105 degrees, 82.5 degrees and 165 degrees.

FIG. 2 illustrates one of a plurality of bit patterns which are part of the halftone dot patterns which comprise a halftone screen density data structure of the present invention utilized to create a halftone image. The halftone density data structure will have more than one, i.e., a plurality of, halftone dot pattern if more than one printing color is required. The placement of the dot centers at preselected angles is identical for each one of the plurality of bit patterns of the halftone screen density data structures. The difference is that unique bit patterns are used for each one of the printing colors. Each bit in the bit map within each halftone dot pattern for each printing color is assigned a value such that the same values are not assigned to the same bit location for each of the bit patterns which comprise the halftone screen density data structure.

Reference is now made to FIGS. 3A-3D to illustrate the actual screened halftone separations which are created using the halftone screen density data structures of the present invention and how these separations are superimposed upon one another to create a halftone image of a desired artwork. FIGS. 3A-3D represent halftone dot structures created using the halftone screen density data structures of the present invention for the four primary colors utilized to reproduce a color halftone image.

To create a complete halftone image, the separations illustrated in FIGS. 3A-3D which are representative of a separation for each of the primary colors, are superimposed one upon the other. The halftone dots for each separation do not directly lay over each other when the separations are superimposed one upon the other. The halftone data structures of the present invention are created so that when the individual separations are superimposed upon each other, the halftone dots of the separation being laid over the underlying separation are offset as a result of the arrangement of the values assigned to the plurality of bits in the bit map so that they are essentially centered in the white space between the halftone dots of the underlying separation. This offset is achieved solely by assigning unique values to each bit in the bit map within each halftone dot for the bit patterns for each printing color so that the same values are not assigned to the same bit location for each of the bit patterns which comprise the halftone screen density data structure.

Figure 3A:
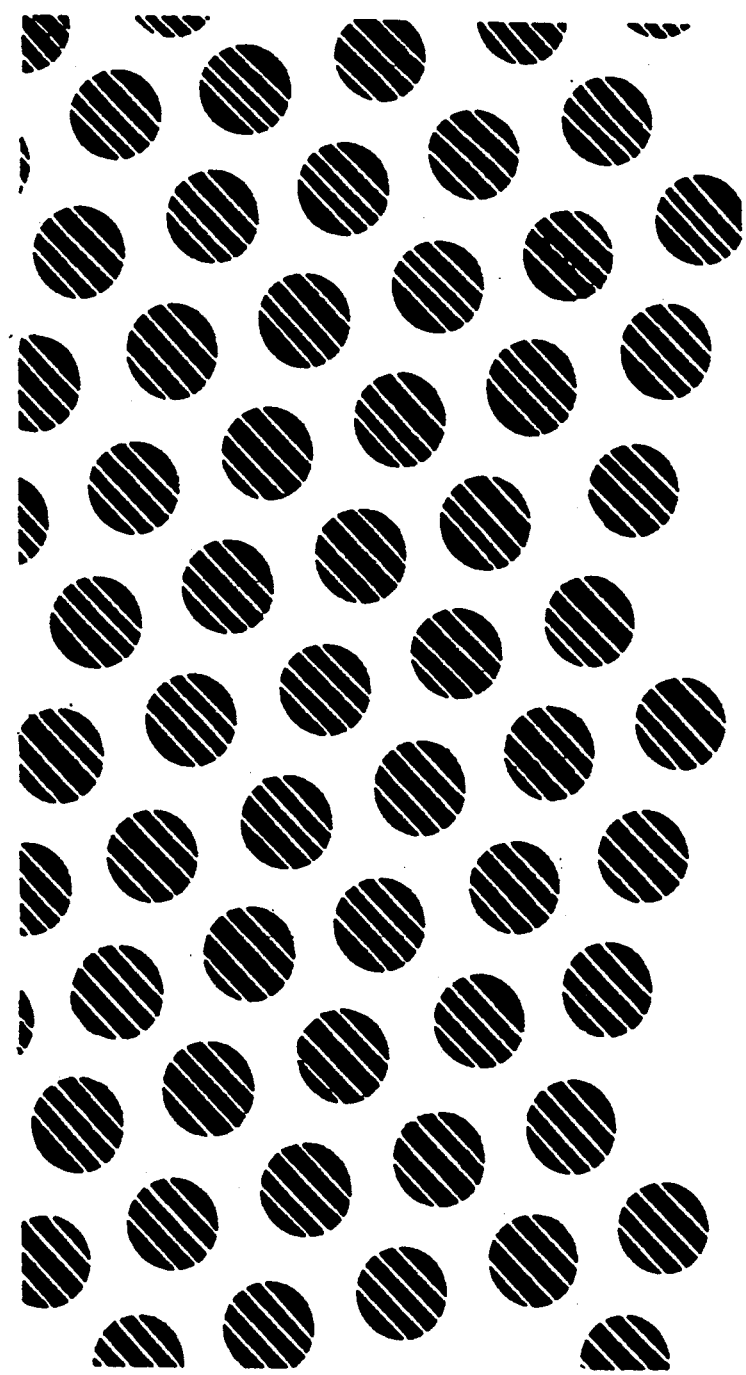
FIGS. 3A-3D illustrate exemplary halftone dot structures created using the halftone screen density data structures of of the present invention.
Figure 3B:
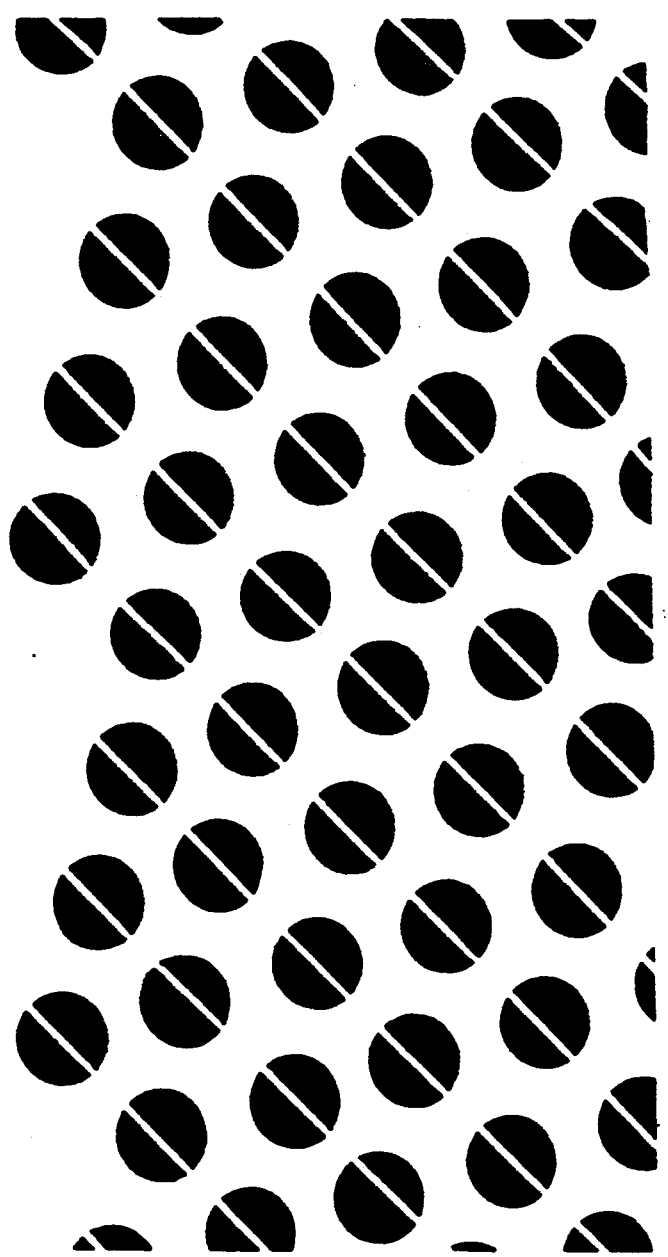
Figure 3C:
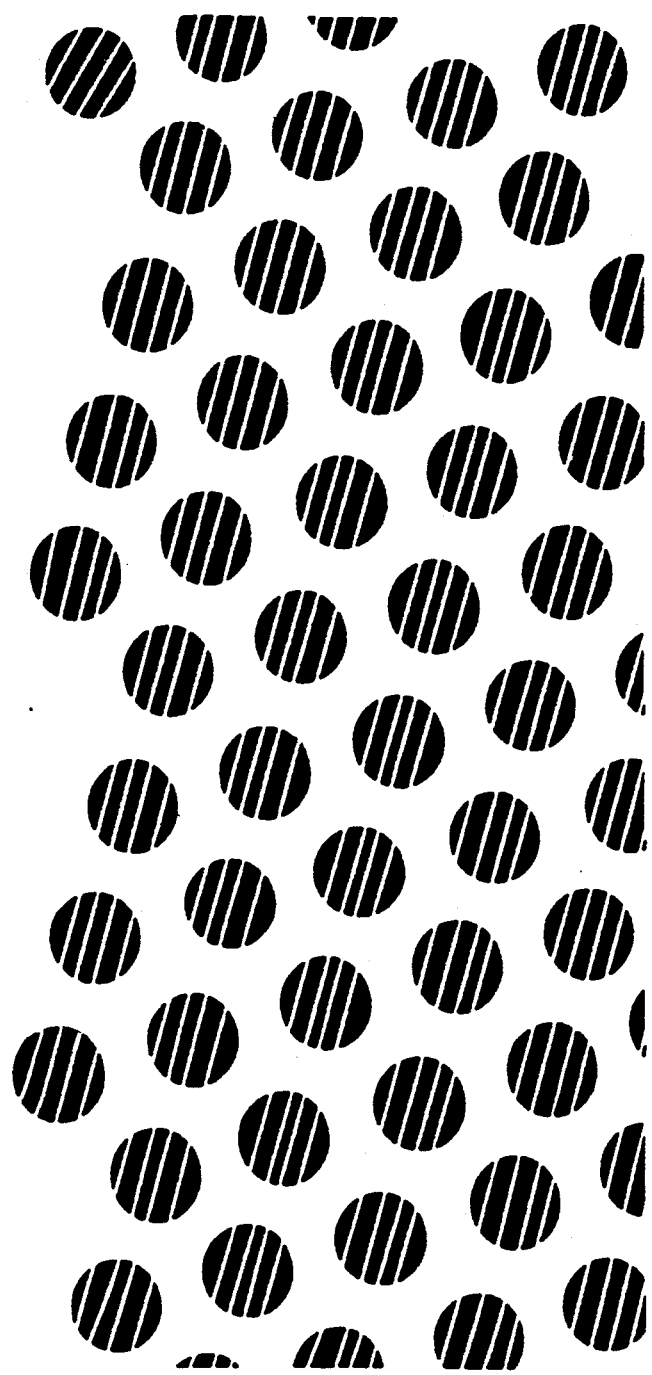
Figure 3D:
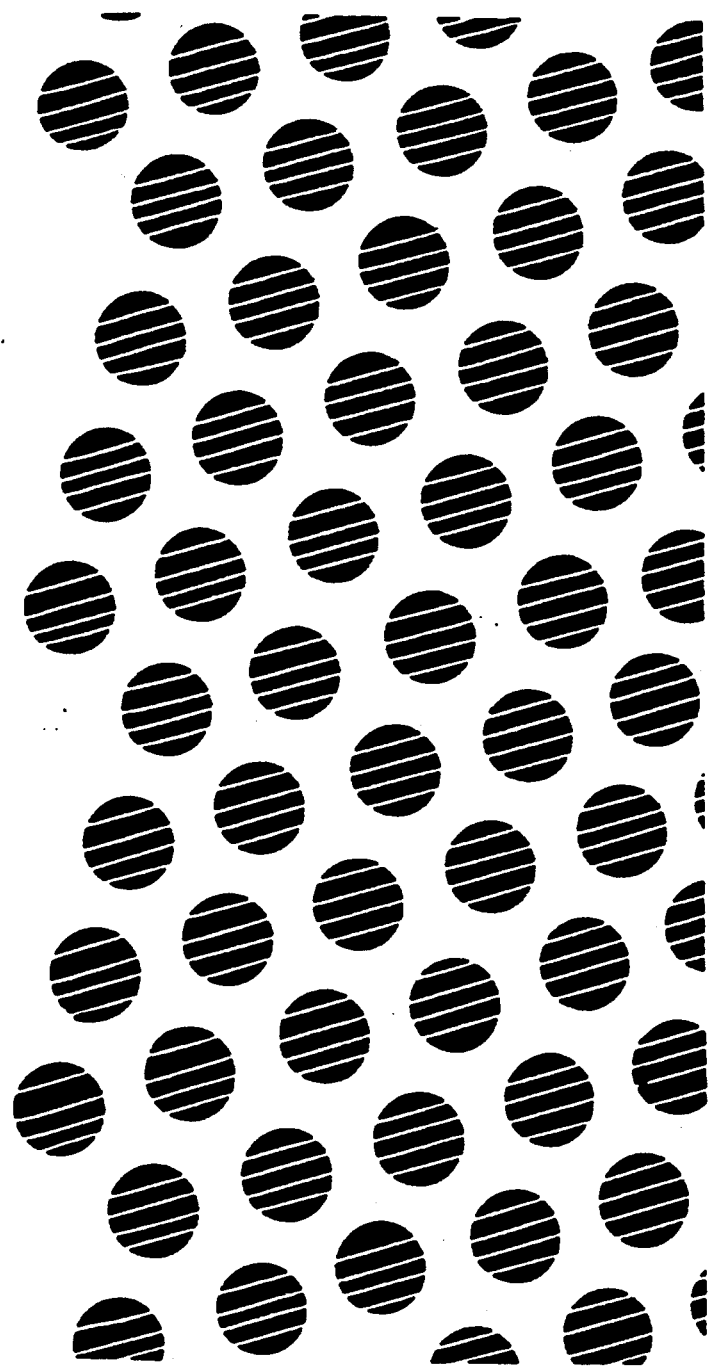
Figure 4A:
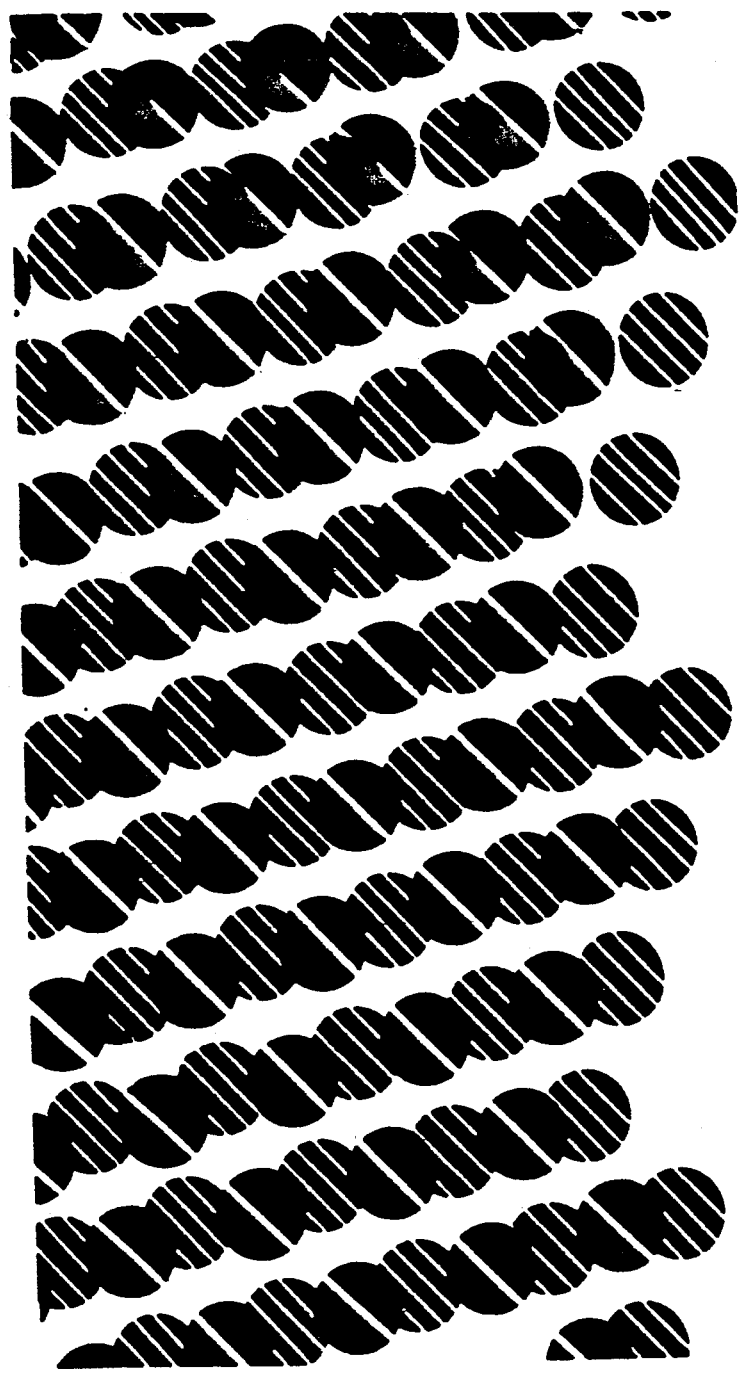
FIG. 4A-4C illustrate composite arrays formed by the sequential superimposition of the halftone dot structures of FIGS. 3A-3D.
Figure 4B:
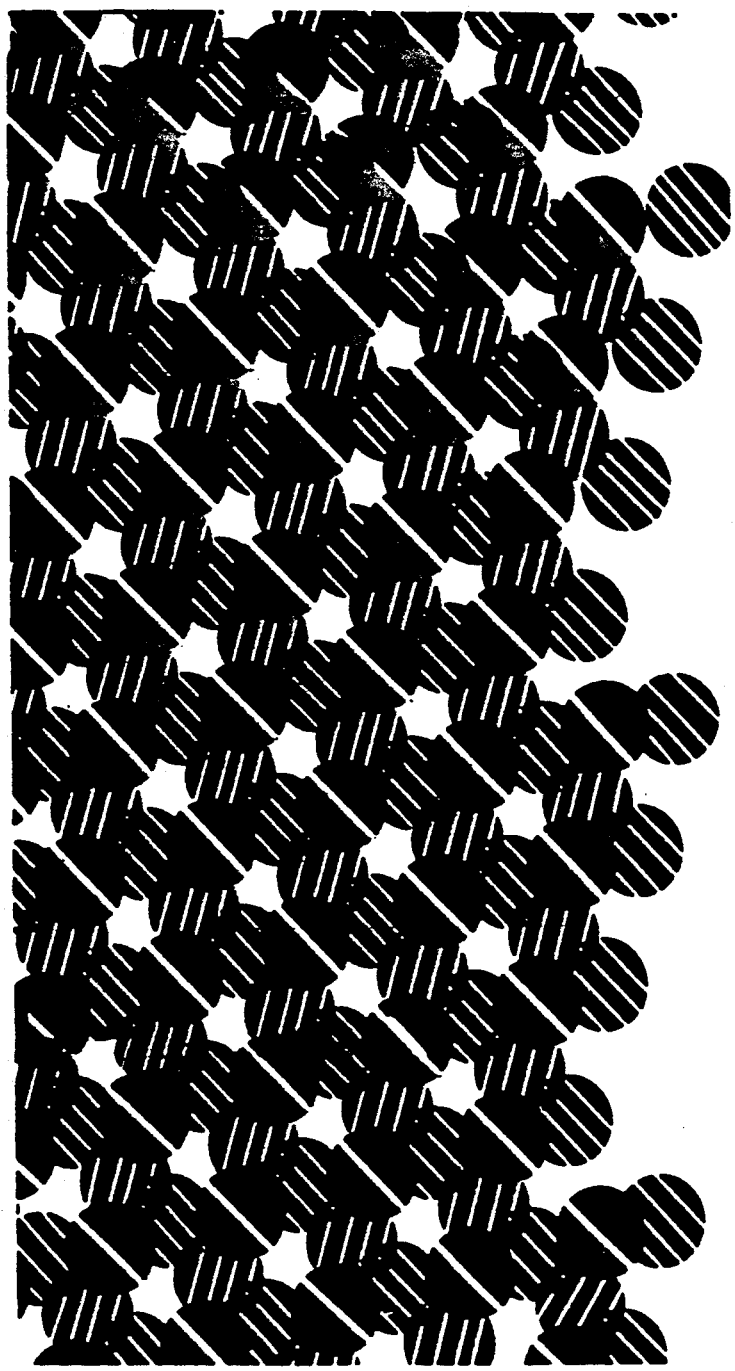
Figure 4C:
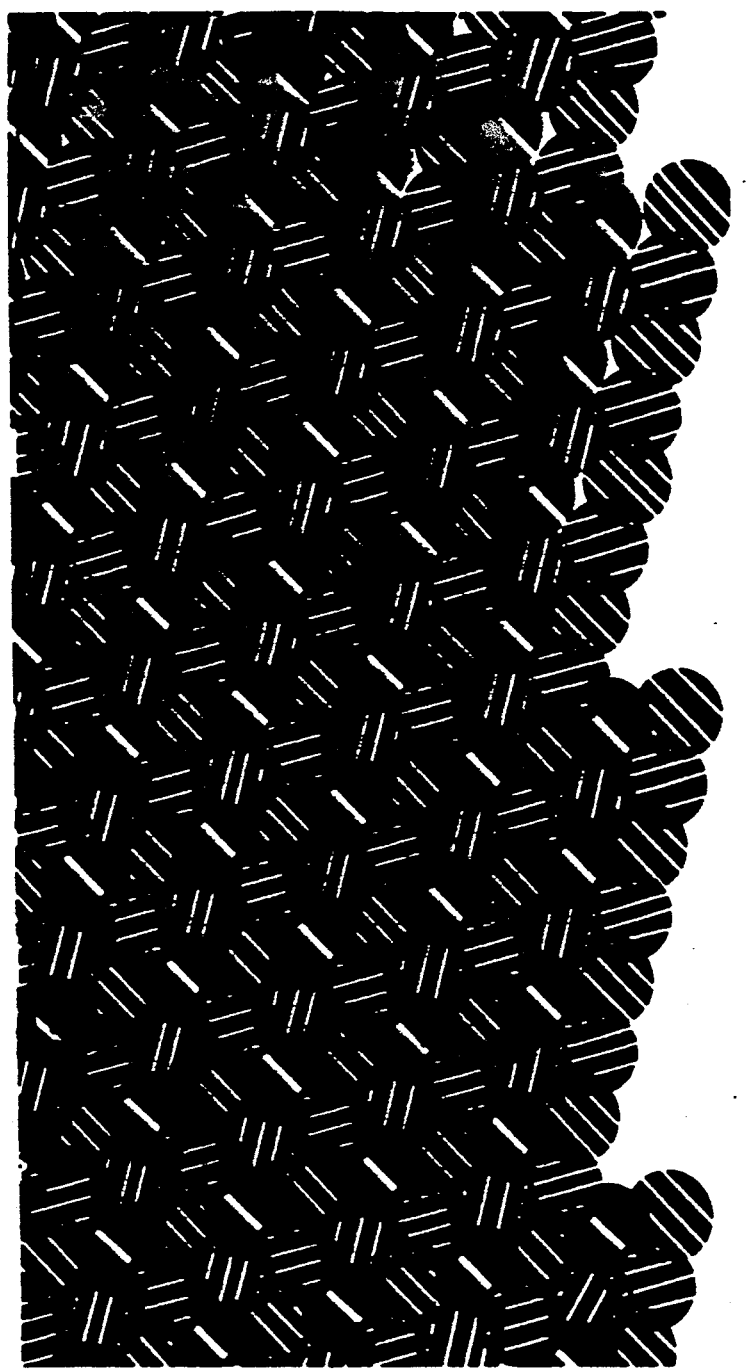

FIGS. 4A-4C illustrate sequentially how the individual separations are superimposed upon each other. Referring now to FIG. 4A, there is illustrated FIG. 3B superimposed upon FIG. 3A. As illustrated, when the halftone dots of FIG. 3B are superimposed upon FIG. 3A, the dots of FIG. 3B are offset so that they are essentially centered in the white spaces between the halftone dots in FIG. 3A. Note that the overlaying of the separations involves simply placing the separations one on top of the other in a parallel fashion and that the angular relationship of the dots comprising the dot patterns in FIGS. 3A and 3B are identical. Similarly, FIG. 4B 10 illustrates the results of the superimposition of FIG. 3C over FIG. 4A. The halftone dots of FIG. 3C are superimposed upon FIG. 4A one on top of the other in a parallel fashion. As a result, the halftone dots of FIG. 3C are essentially centered in the white spaces between the halftone dots in FIG. 4A. Finally, FIG. 4C illustrates the end product of the superimposition of all the color separations. Once again, the halftone dots of FIG. 3D are superimposed upon FIG. 4B such that the halftone dots of FIG. 3D are essentially centered in the white spaces between the halftone dots in FIG. 4B. The resulting product of the foregoing overlaying scheme accomplished by the halftone screen density data structure of the present invention produces a very uniform pattern which results in improved color quality images.

Figure 5:
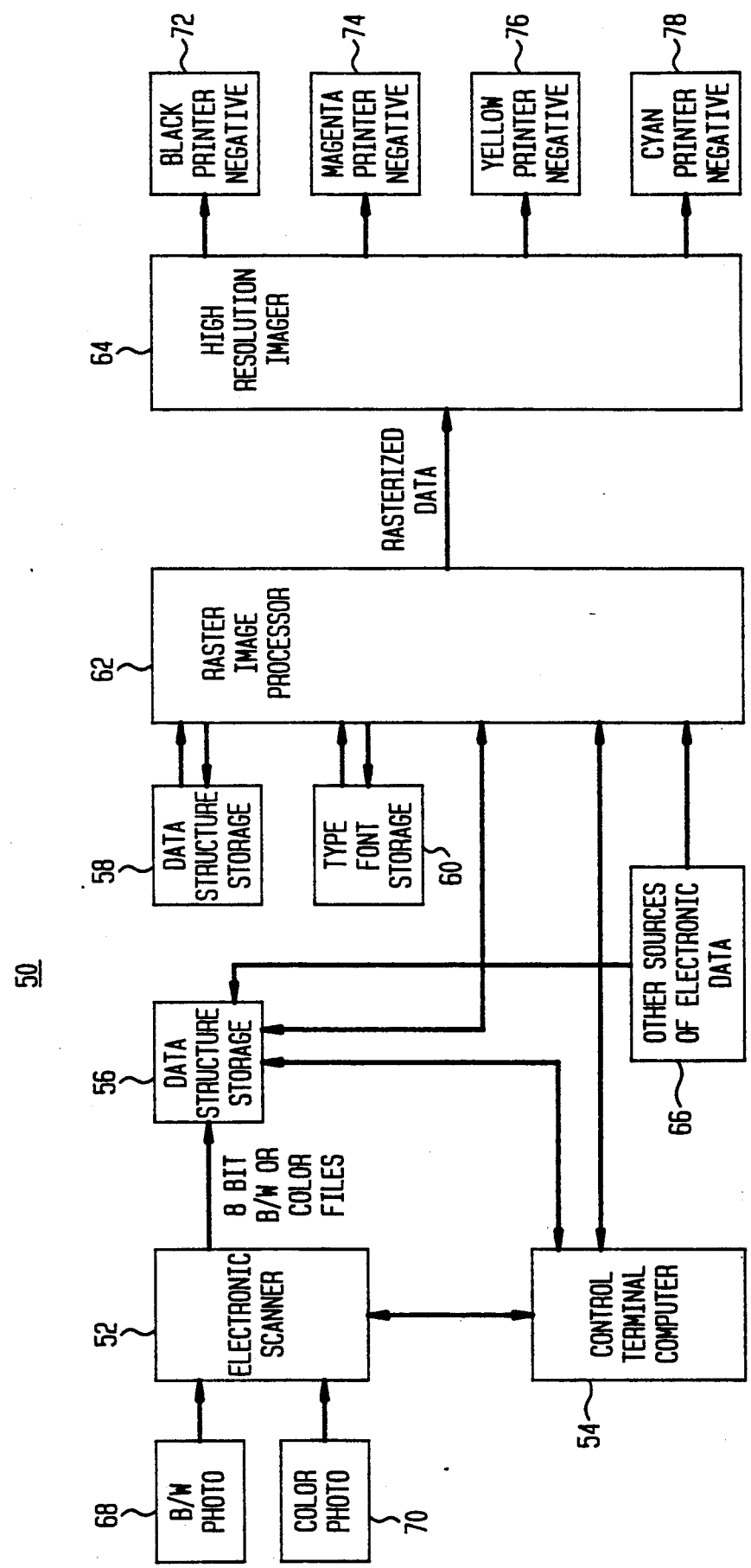
FIG. 5 is an illustration of an exemplary embodiment of an electronic image processing system for utilizing the halftone data structure arrangements of the present invention.

Referring now to FIG. 5, there is illustrated in block diagram form, an exemplary embodiment of an electronic image processing system for utilizing the halftone screen density data structures of the present invention to create halftone images. The system 50 comprises an electronic scanner 52, a control terminal computer 54, a data storage device 56, data structure storage 58, type font storage 60, a raster image processor 62, a high resolution imager 64 and other sources of electronic data 66.

The control terminal computer 54 is coupled to the electronic scanner 52, the data storage device 56 and the raster image processor 62. The electronic scanner 52 is coupled to the computer data storage device 56, which is coupled to the raster image processor 62 and the other sources of electronic data 66. The data structure storage 58, the type font storage 60 and the other sources of electronic data 66 are coupled to the raster image processor 62 which is coupled to the high resolution imager 64.

The electronic scanner 52 transforms artwork from a continuous image to distinct binary representations of the artwork for each printing color in the case of color artwork. The scanner 52 can comprise a sensor array, a photomultiplier system, or other known means for scanning and converting continuous images to binary values. The binary representations indicate the density values for the printing colors for specific areas of the artwork. The actual binary representations can be represented by N number of bits where N is typically eight bits to thereby accommodate a range of density values from 0 to 255.

The binary representations of the density values of the artwork are output by the electronic scanner 52 as files and stored in the data storage device 56. This information is stored as distinct entities for each printing color for the artwork. The data storage device 56 can be a disk drive, personal computer storage or any other type of storage media known in the art. The data storage device 56 can also include a graphics integrator to facilitate the storing of multiple types of graphics in the same file as may be required by the raster image processor 62.

The electronic scanner 52, the data storage device 56 and the raster image processor 62 can be controlled by the control terminal computer 54. The control terminal computer 54 provides a user interface to the electronic image processing system 50. It is through this interface that a user may control the scanning and reproduction of artwork as well as provide a means for a user to modify the scanned data stored in the data storage device 56 to "touch up" a scanned image.

The other sources of electronic data 66 provide an interface to the system 50 to allow for the inputting of additional image data that would be in a form that could be interpreted by the raster image processor 62.

The raster image processor 62 retrieves the scanned data from the data storage device 56, either automatically or under the control of a user at the control terminal computer 54. The raster image processor 62 has a memory (not shown) associated therewith. The raster image processor 62 converts density data to a pixel format that can be utilized by the imager 64 to reproduce halftone images. The raster image processor 62 accesses the data structure storage 58, the type font storage 60 and the density data retrieved from the data storage device 56, as necessary, to rasterize the density data, i.e., create a string of pixels representative of the density data. The raster image processor 62 may also have the ability to perform other application driven functions to enhance the reproduction of the artwork.

The raster image processor 62 outputs rasterized data to the high resolution imager 64 which is, e.g., a laser scanning device. Upon receiving the rasterized data, the laser scans the rasterized data to reproduce a halftone image based upon the state of the pixels in the bit map pixel arrangement passed to the imager 64.

The imager 64 may also be a cathode ray tube scanning device, a thermal printer, an ink jet printer or any other device known to the art for converting rasterized data into a tangible media. The output of the imager 64 is a function of what type of imager 64 is used. If the imager 64 is a laser scanning device, the output could be a series of negatives 72, 74, 76 and 78, one for each primary color. Similarly, the output of the imager 64 could be a series of positives or printing plates. If negatives or positives are produced, they would subsequently be transferred to printing plates by contact printing to print the reproduced image on a printing press. If the imager 64 is an ink jet printer or a thermal printer, the output would be a printed copy of the reproduced artwork.

To reproduce artwork, i.e., a photograph, using the electronic image processing system 50 illustrated in FIG. 5, the artwork is entered into the electronic scanner 52. The artwork as shown in FIG. 5 can be a black and white photograph 68 or a color photograph 70. For this example, the color photograph 70 is utilized as the desired artwork. The artwork 70 is scanned to create a digital image of the artwork 70. The artwork 70 is imaged through an optical lens (not shown) to a sensor array (also not shown). The sensor array typically comprises an integrated circuit chip which may include approximately 4,000 individual sensors. As the artwork passes over the sensor array, it is sampled at a preselected rate which is selected to be greater than the highest screen ruling at which the system is capable of reproducing an image. A typical practice in the art to obtain a satisfactory sampling rate is to multiply the desired screen ruling, i.e., the number of lines of halftone dots per inch in each direction, by the square root of two.

When the artwork is scanned, it is filtered into its individual primary color components to create a digital image color separation for each primary color. The artwork is scanned to obtain the density values of each area of the artwork sampled to create a database of density values for each primary color. The density value for each primary color is the amount of light reflected from or passed through the specific area of the artwork being sampled. The range of the density values depends upon the number of bits that are used by the electronic scanner 52 to represent the range of density values of the primary colors. As discussed above, typically 8 bits are used to thereby provide a range of density values from 0 to 255. The artwork is scanned at the preselected sampling rate for each primary color to obtain a binary representation of the density of the artwork. The binary representation of the density of the artwork for each primary color is maintained in a data base which is stored in the data storage device 56 as an entity. This information is maintained in an array pattern as an entity so that it can be easily retrieved and reproduced as a digital separation for each primary color.

Once the artwork 70 is scanned and stored as digital images, a user may manipulate the digital image of the artwork 70 or perform a number of functions such as merging other graphics data with the scanned image through the control terminal computer 56.

To reproduce the artwork 70 as a halftoned image, the raster image processor 62 retrieves and processes the density data representative of one of the primary colors from the data base in the data storage device 56. This process is repeated for each primary color until four digital separations for each primary color have been created in memory associated with the raster image processor 62 in pixel format. As will be described in detail below, the raster image processor 62 processes the density data one sample at a time by comparing each sample to a portion of a halftone dot pattern for the primary color being processed of a preselected half tone screen data structure retrieved from the data structure storage 64. The portion of the halftone dot pattern of the retrieved preselected halftone screen density data structure that is scanned per entry from the data base stored in the data storage device 56 is determined by dividing the resolution of the imager 64 by the number of samples per inch stored in the data base maintained in the data storage device 56. To illustrate, as discussed above, the sampling rate is determined by the lines per inch of the screen ruling that is desired for the reproduced image multiplied by the square root of 2. Thus, for a screen ruling of 180 lines per inch, the sampling rate would be 254 samples per inch. If the resolution of the imager 64 is 1016 lines per inch, then the portion of the selected halftone screen density data structure would be a four by four pixel array.

As a result of the foregoing comparison, the raster image processor 62 will set bits in portions of the halftone dot pattern of the preselected halftone data structure maintained in memory of the raster image processor 62 which correspond to the processed density data. This, in turn, will cause selected pixels to be turned on when the imager 64 reproduces the screen to represent the desired density for the area represented by the sample. The size of the bit map of the preselected halftone screen density data structure in memory is a function of the imager resolution chosen for the reproduction of the halftone scanned artwork 70.

This process is repeated until a separation for each primary color is created in pixel format which reflects the density patterns across the image. When each array stored in the data base for the current artwork 70 is recreated in pixel format, they are output to the imager 64 where they can be reproduced onto a photographic media.

To further illustrate the present invention, an actual example of a reproduction of a scanned artwork image will be explained utilizing the halftone data structure illustrated in FIG. 2 and the electronic image processing system 50 illustrated in FIG. 5. Prior to initiating the transformation of the digital image of the scanned artwork 70, the raster image processor 62 retrieves one of the halftone dot patterns of a preselected halftone screen density data structure, e.g., as illustrated in FIG. 2, to memory in the raster image processor 62 to create a bit map image in pixel format for a separation for one of the printing colors, e.g., black. The preselected halftone screen density data structure utilized is dictated by the resolution of the imager 64.

Once the halftone dot pattern of the preselected halftone screen density data structure for black is retrieved, the raster image processor 62 sequentially processes the entries in the data base to ascertain the density values for each specific area represented by the sample entries. To accomplish this, the raster image processor 62 reads in the entry from the data base starting at address 0 and obtains a sample of density data having a density value of, e.g., 15. The raster image processor 62 then scans a portion of the halftone dot pattern of the retrieved preselected halftone screen density data structure resident in its associated 15 memory, starting at the left-most corner of the bit map illustrated in FIG. 2, indicated by reference numeral 25, to determine if any of the values assigned to the bits in the current portion are less than or equal to the current density value of 15. As discussed above, the portion of halftone dot pattern of the retrieved preselected halftone screen density data structure that is scanned per entry from the data base stored in the data storage device 56 is determined by dividing the resolution of the imager 64 by the number of samples per inch stored in the data base maintained in the data storage device 56. For this example, it is assumed that a screen ruling of 180 lines per inch is chosen and the resolution of the imager 64 is 1016 lines per inch. Therefore, the portion of the selected halftone screen density data structure would be a four by four pixel array delineated by the reference numeral 26 on FIG. 2.

If any of the bits in the current portion of halftone dot pattern of the preselected half tone data structure are less than or equal to the current density value being processed, e.g., 15, the raster image processor 62 sets those bits in the bit map. For this density value in this portion of the selected halftone screen density data structure, there are seven bits that are less than or equal to 15. Thus, the raster image processor would set these seven bits.

The foregoing process is continuously repeated for each entry in the data base for the next four by four pixel array in the halftone dot pattern of the preselected halftone screen density data structure thereby creating a string of four by four pixel arrays for the entire printing color separation being created that reflects the density pattern for the current printing color, black, across the halftone image being reproduced. The process is then repeated for each entry in the remaining printing color data bases using the appropriate one of the halftone dot patterns of the preselected halftone screen density data structure for each of the remaining printing colors until a separation is created for each printing color which reflects the density pattern across the halftone image to be reproduced.

As discussed above, when each array representative of the density values for each of the printing colors stored in the data base for the current artwork is recreated in a separation in pixel format, the separations can then be output to the imager 64 where they can be reproduced onto photographic media. Typically, the photographic media is a "separation negative" or a "separation positive". These negatives or positives can be contacted to printing plates which are used by a printing press to complete the reproduction process and produce a halftoned image of the scanned artwork.

It should be understood that the foregoing description of the present invention is meant to be illustrative only since there are a variety of different halftone screen density data structures which can be utilized following the teachings of the present invention. Thus, although only a few examples of the present invention have been described in detail, it is clear that the features of the present invention may be adapted to many different situations without departing from the spirit of the invention.

What is claimed is:

1. A halftone screen density data structure used for the electronic processing of artwork into halftone images, comprising:
   at least one halftone dot pattern corresponding to a printing color including:
      a plurality of halftone dots, each one of the plurality of halftone dots having a dot center,
      the plurality of halftone dots being arranged so that each one of the plurality of halftone dots is a center halftone dot surrounded by a preselected number of the plurality of halftone dots,
      the dot centers of the preselected number of the plurality of halftone dots being placed at a preselected distance and at preselected screen angles from the dot center of the center halftone dot.

2. The halftone screen density data structure according to claim 1 wherein the at least one halftone dot pattern includes a plurality of bits arranged as a bit map, each one of the plurality of bits in the bit map having a value assigned to it in a predetermined fashion, and wherein the plurality of halftone dots are superimposed over the bit map.

3. A halftone screen density data structure used for the electronic processing of artwork into halftone images, comprising:
   at least one halftone dot pattern corresponding to a printing color including:
      a plurality of bits arranged as a bit map, each one of the plurality of bits in the bit map having a value assigned to it in a predetermined fashion,
      a plurality of halftone dots superimposed over the bit map, each one of the plurality of halftone dots having a dot center,
      the plurality of halftone dots being arranged so that each one of the plurality of halftone dots is a center halftone dot surrounded by a preselected number of the plurality of halftone dots,
      the dot centers of the preselected number of the plurality of halftone dots being placed at a preselected distance and at preselected screen angles from the dot center of the center halftone dot.

4. The halftone screen density data structure of claim 3 wherein the plurality of bits in the bit map are assigned values so as to approximate a preselected structure for the halftone dots.

5. The halftone screen density data structure of claim 3 wherein the preselected distance at which the dot centers of the preselected number of the plurality of halftone dots are placed is the inverse of a preselected screen ruling.

6. The halftone screen density data structure of claim 3 wherein the dot center of one of the preselected number of dots arranged to surround the center dot is at a screen angle of 45 degrees.

7. The halftone screen density data structure of claim 6 wherein the dot center of a second one of the preselected number of dots arranged to surround the center dot is at a screen angle of 105 degrees.

8. The halftone screen density data structure of claim 7 wherein the dot center of a third one of the preselected number of dots arranged to surround the center dot is at a screen angle of 165 degrees.

9. The halftone screen density data structure of claim 3 wherein the dot center of one of the preselected number of dots arranged to surround the center dot is at a screen angle of 105 degrees.

10. The halftone screen density data structure of claim 3 wherein the dot center of one of the preselected number of dots arranged to surround the center dot is at a screen angle of 165 degrees.

11. The halftone screen density data structure of claim 3 further comprising a plurality of halftone dot patterns each corresponding to a printing color.

12. The halftone screen density data structure of claim 11 wherein the plurality of bits in the bit map for each one of the plurality of halftone dot patterns are assigned unique values to identical bit locations in each of the bit maps for each one of the plurality of halftone dot patterns.

13. The halftone screen density data structure of claim 11 wherein the plurality of halftone dot patterns corresponding to a printing color are oriented in parallel with respect to each other.

14. The halftone screen density data structure of claim 3 wherein the halftone data structure is stored on a storage medium.

15. The halftone screen density data structure of claim 14 wherein the storage medium is a diskette.

16. A method for processing and reproducing artwork into halftone images in an electronic image processing system having a memory device associated therewith, comprising the steps of:
   (a) maintaining values representative of the light stopping ability of artwork to be reproduced as a halftone image in a data base;
   (b) arranging a preselected halftone screen density data structure as
      (i) at least one halftone dot pattern corresponding to a printing color including:
         (1) a plurality of bits arranged as a bit map, each one of the plurality of bits in the bit map having a value assigned to it in a predetermined fashion,
         (2) a plurality of halftone dots superimposed over the bit map, each one of the plurality of halftone dots having a dot center,
         (3) the plurality of halftone dots being arranged so that each one of the plurality of halftone dots is a center halftone dot surrounded by a preselected number of the plurality of halftone dots,
         (4) the dot centers of the preselected number of the plurality of halftone dots being placed at a preselected distance and at preselected screen angles from the dot center of the center halftone dot;
   (c) retrieving the preselected halftone data structure into the memory device;
   (d) comparing a value stored in the data base to a current preselected portion of the plurality of bits in the preselected halftone data structure;
   (e) setting each one of the bits in the preselected portion of the plurality of bits in the preselected halftone data structure that correspond to the value from the data base; and
   (f) repeating steps (d) and (e) for each value stored in the data base to create a screened halftone separation, each time comparing the value stored in the data base to a next preselected portion of the plurality of bits in the preselected halftone data structure.

17. The method according to claim 16 wherein the step of arranging a preselected halftone screen density data structure includes the step of arranging the preselected halftone screen density data structure as a plurality of halftone dot patterns each corresponding to a printing color.

18. The method according to claim 17 wherein the step of arranging a preselected halftone screen density data structure includes the step of assigning unique values to identical bit locations in each of the bit maps for each one of the plurality of halftone dot patterns.

19. The method according to claim 17 further comprising the step of orienting the plurality of halftone dot patterns corresponding to a printing color in parallel with respect to each other.

20. A method for processing and reproducing artwork into halftone images in an electronic image processing system having a memory device associated therewith, comprising the steps of:
   (a) scanning an artwork by sampling the artwork to obtain values representative of the light stopping ability of the artwork;
   (b) storing the values in a data base;
   (c) arranging a preselected halftone screen density data structure as
      (i) at least one halftone dot pattern corresponding to a printing color including:
         (1) a plurality of bits arranged as a bit map, each one of the plurality of bits in the bit map having a value assigned to it in a predetermined fashion,
         (2) a plurality of halftone dots superimposed over the bit map, each one of the plurality of halftone dots having a dot center,
         (3) the plurality of halftone dots being arranged so that each one of the plurality of halftone dots is a center halftone dot surrounded by a preselected number of the plurality of halftone dots,
         (4) the dot centers of the preselected number of the plurality of halftone dots being placed at a preselected distance and at preselected screen angles from the dot center of the center halftone dot;
   (d) retrieving the preselected halftone data structure into the memory device;
   (e) comparing a value stored in the data base to a current preselected portion of the plurality of bits in the preselected halftone data structure;
   (f) setting each one of the bits in the preselected portion of the plurality of bits in the preselected halftone data structure that correspond to the value from the data base; and
   (g) repeating steps (e) and (f) for each value stored in the data base to create a screened halftone separation, each time comparing the value stored in the data base to a next preselected portion of the plurality of bits in the preselected halftone data structure.

21. The method according to claim 20 wherein the step of arranging a preselected halftone screen density data structure includes the step of arranging the preselected halftone screen density data structure as a plurality of halftone dot patterns each corresponding to a printing color.

22. The method according to claim 21 wherein the step of arranging a preselected halftone screen density data structure includes the step of assigning unique values to identical bit locations in each of the bit maps for each one of the plurality of halftone dot patterns.

23. The method according to claim 21 further comprising the step of orienting the plurality of halftone dot patterns corresponding to a printing color in parallel with respect to each other.

24. A method according to any one of claims 16 or 20 further comprising the steps of:
   (a) outputting the screened halftone separation to an imager; and
   (b) converting the screened halftone separation to a halftone image of the artwork.

25. An electronic image processing system comprising:
   a memory device containing a data base which includes:
      a digital representation of a scanned artwork which was created by sampling the artwork to obtain values representative of the light stopping ability of the artwork, and
      a halftone screen density data structure comprising at least one halftone dot pattern corresponding to a printing color including:
         a plurality of bits arranged as a bit map, each one of the plurality of bits in the bit map having a value assigned to it in a predetermined fashion,
         a plurality of halftone dots superimposed over the bit map, each one of the plurality of halftone dots having a dot center,
         the plurality of halftone dots being arranged so that each one of the plurality of halftone dots is a center halftone dot surrounded by a preselected number of the plurality of halftone dots,
         the dot centers of the preselected number of the plurality of halftone dots being placed at a preselected distance and at preselected screen angles from the dot center of the center halftone dot;
   a raster image processor coupled to the memory device including:
      means for comparing the values stored in the data base to preselected portions of the plurality of bits in the preselected halftone data structure, and
      means for setting each one of the bits in the preselected portion of the plurality of bits in the preselected halftone data structure that correspond to the value from the data base.

26. The system according to claim 25 wherein the raster image processor further comprises means for outputting the retrieved preselected halftone data structure, the system further comprising an imager coupled to the raster image processor, the imager comprises means for converting the retrieved preselected halftone data structure passed to it by the raster image processor to a halftone image of the artwork.

27. The system according to claim 25 further comprising an electronic scanner coupled to the raster image processor for creating the digital representation of the scanned artwork.

28. The halftone screen density data structure of claim 25 further comprising a plurality of halftone dot patterns each corresponding to a printing color.

29. The halftone screen density data structure of claim 28 wherein the plurality of bits in the bit map for each one of the plurality of halftone dot patterns are assigned unique values to identical bit locations in each of the bit maps for each one of the plurality of halftone dot patterns.

30. The halftone screen density data structure of claim 28 wherein the plurality of halftone dot patterns corresponding to a printing color are oriented in parallel with respect to each other.

31. An electronic image processing system comprising:
   an electronic scanner for creating a digital representation of artwork by sampling the artwork to obtain values representative of the light stopping ability of the artwork,
   a first memory device coupled to the electronic scanner, the memory device including a data base for storing the values created by the electronic scanner;
   a second memory device for storing a halftone screen density data structure comprising
      at least one halftone dot pattern corresponding to a printing color including:
         a plurality of bits arranged as a bit map, each one of the plurality of bits in the bit map having a value assigned to it in a predetermined fashion,
         a plurality of halftone dots superimposed over the bit map, each one of the plurality of halftone dots having a dot center,
         the plurality of halftone dots being arranged so that each one of the plurality of halftone dots is a center halftone dot surrounded by a preselected number of the plurality of halftone dots,
         the dot centers of the preselected number of the plurality of halftone dots being placed at a preselected distance and at preselected screen angles from the dot center of the center halftone dot;
   a raster image processor coupled to the first and second memory device including:
      means for comparing the values stored in the data base to preselected portions of the plurality of bits in the preselected halftone data structure,
      means for setting each one of the bits in the preselected portion of the plurality of bits in the preselected halftone data structure that correspond to the value from the data base, and
      means for outputting the retrieved preselected halftone data structure;
   an imager coupled to the raster image processor, the imager comprises means for converting the retrieved preselected halftone data structure passed to it by the raster image processor to a halftone image of the artwork.

32. The halftone screen density data structure of claim 31 further comprising a plurality of halftone dot patterns each corresponding to a printing color.

33. The halftone screen density data structure of claim 32 wherein the plurality of bits in the bit map for each one of the plurality of halftone dot patterns are assigned unique values to identical bit locations in each of the bit maps for each one of the plurality of halftone dot patterns.

34. The halftone screen density data structure of claim 32 wherein the plurality of halftone dot patterns corresponding to a printing color are oriented in parallel with respect to each other.

* * * * *